March 3, 1936. B. H. BROADBENT 2,032,833
MEASURING AND RECORDING APPARATUS
Filed Jan. 27, 1932 5 Sheets-Sheet 1
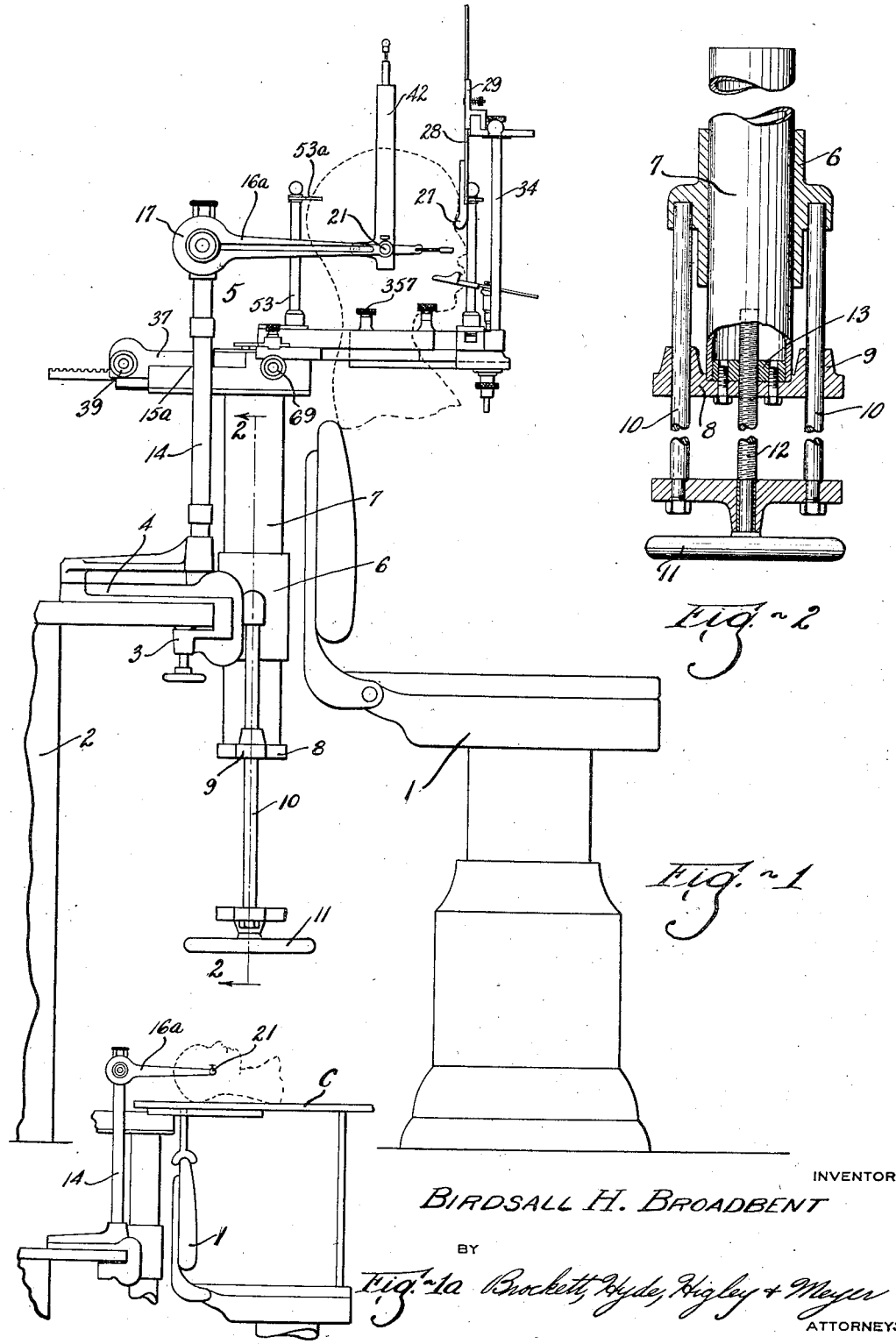
INVENTOR
BIRDSALL H. BROADBENT
BY
Brockett, Hyde, Higley + Meyer
ATTORNEYS

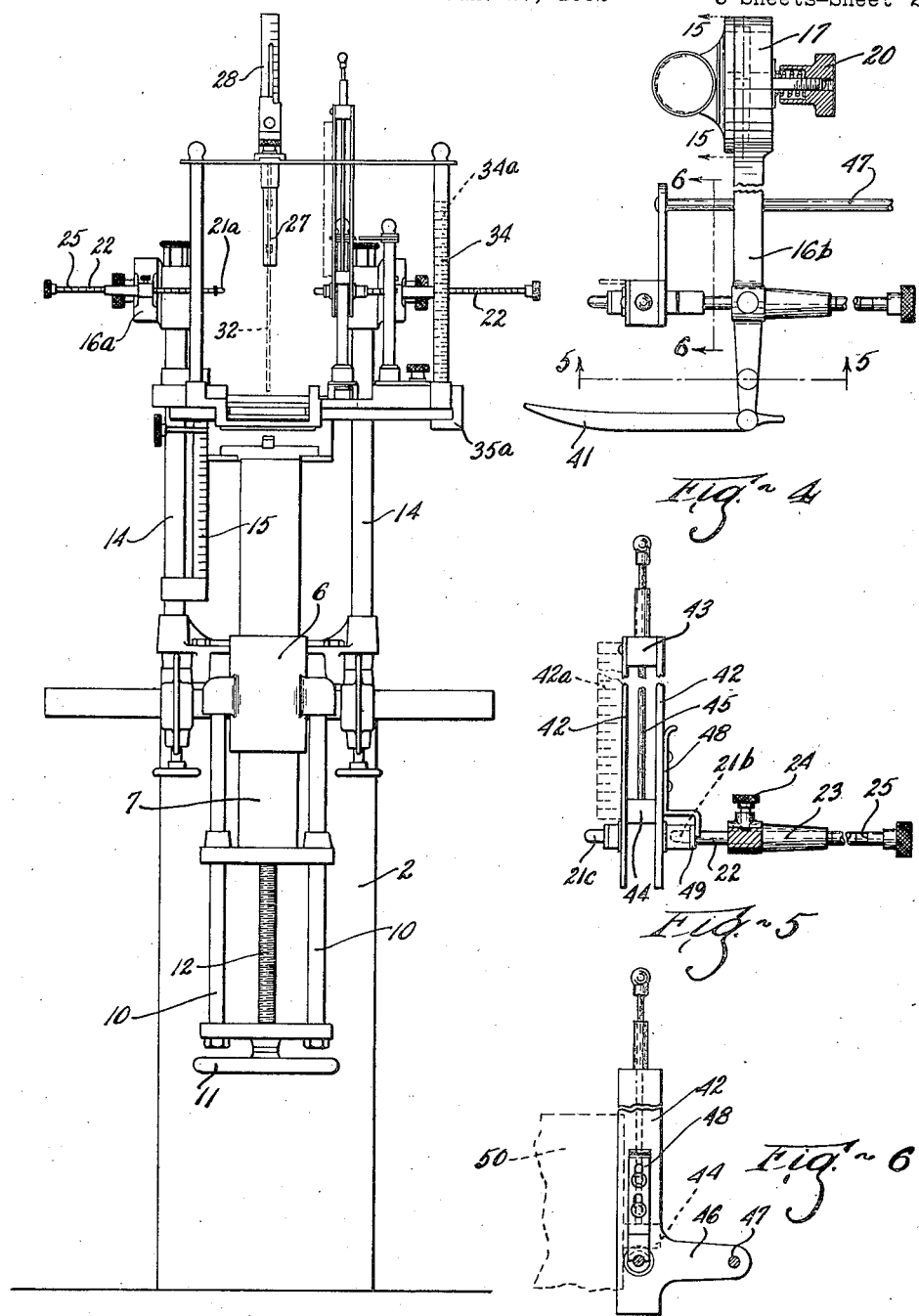

March 3, 1936.　　　　B. H. BROADBENT　　　　2,032,833
MEASURING AND RECORDING APPARATUS
Filed Jan. 27, 1932　　　5 Sheets-Sheet 3

INVENTOR
BIRDSALL H. BROADBENT
BY
Brockett, Hyde, Higley & Meyer
ATTORNEYS

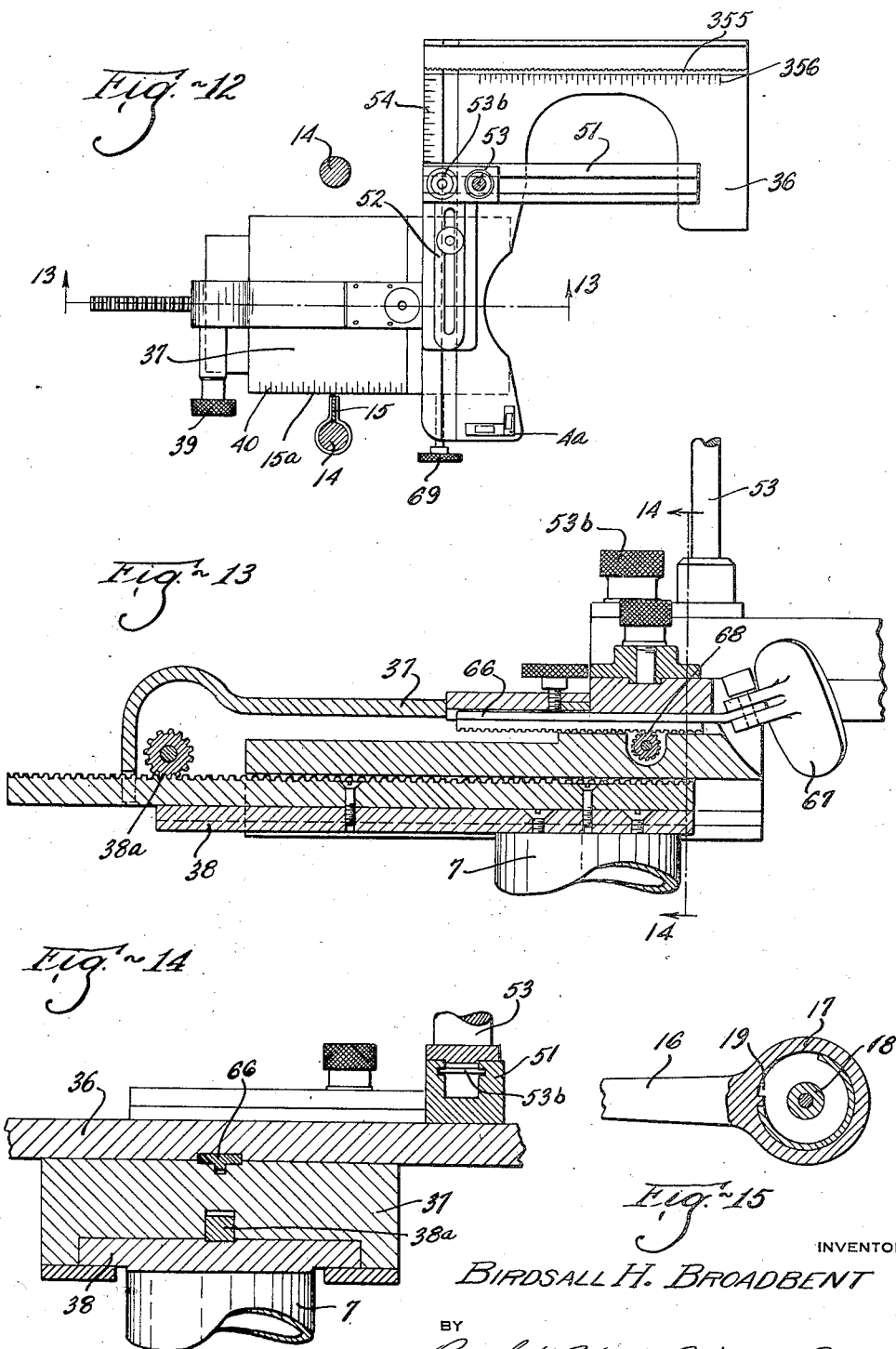

March 3, 1936. B. H. BROADBENT 2,032,833
MEASURING AND RECORDING APPARATUS
Filed Jan. 27, 1932 5 Sheets-Sheet 5

INVENTOR
BIRDSALL H. BROADBENT
BY
Brockett, Hyde, Higley & Meyer
ATTORNEYS

Patented Mar. 3, 1936

2,032,833

UNITED STATES PATENT OFFICE 2,032,833

MEASURING AND RECORDING APPARATUS

Birdsall H. Broadbent, Shaker Heights, Ohio

Application January 27, 1932, Serial No. 590,402

26 Claims. (Cl. 250—34)

This invention relates to a method and apparatus for use in the measurement, study and recording of cranial development, such as in children, in connection with physical anthropology, orthodontia, or the like. It aims to provide means by which accurate measurements and permanent Roentgenographic and other records may be produced from live subjects at different periods of growth, with the obvious possibility of exact comparative study and its many advantages.

To the end of standardizing a practical technique based upon more or less permanent craniometric and cephalometric landmarks which not only may be utilized readily without discomfort, but are also reliable and avoid the uncertainties of prior methods which approached such landmarks through the skin and soft tissues, the pesent invention makes use of Roentgenographic practices coupled with methods and apparatus for definitely orientating the head to the X-ray source and the skull and source to the film, not only to permit accurate re-establishment of the precise conditions of any former examination, but also for comparative studies in projection either of views at different periods of growth or of corresponding but differing contemporaneous views.

Other objects of the invention are the provision of improved head holding and anchoring means adapted for proper placing of the film holder or cassette near to the head, means for locating and supporting the X-ray source in proper position and alinement, means for enabling mouth impressions to be taken under standardized conditions and to be replaced at will in the standard position, and finally, organized means capable of use as a whole by an improved method or technique wherein more or less permanent and standardized records may be produced and brought into comparative relation for study or observation.

Further objects of the invention are in part obvious and in part will appear more in detail in the discussion hereinafter.

Figure 7:
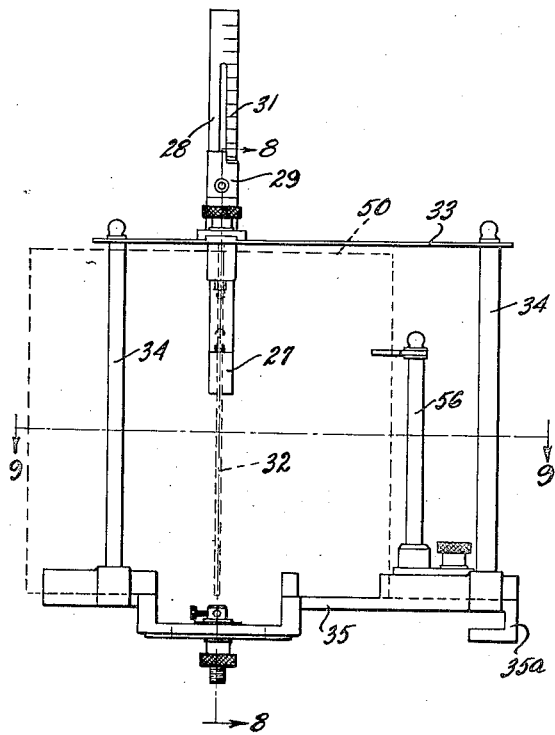
Figure 8:
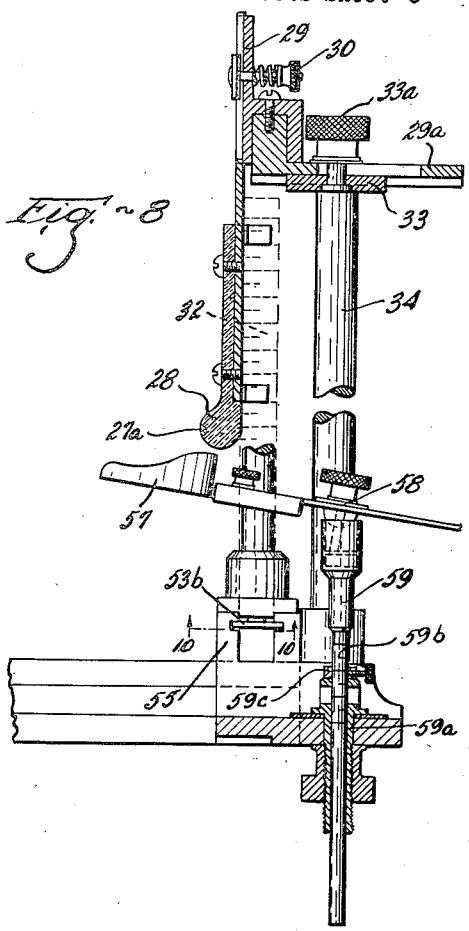
Figure 9:
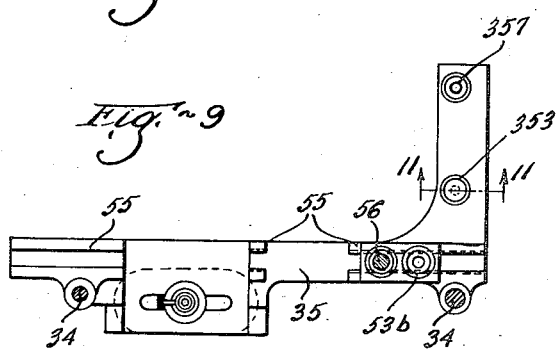
Figure 11:
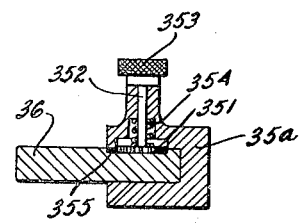
Figure 10:
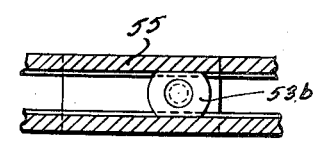
Figure 16:
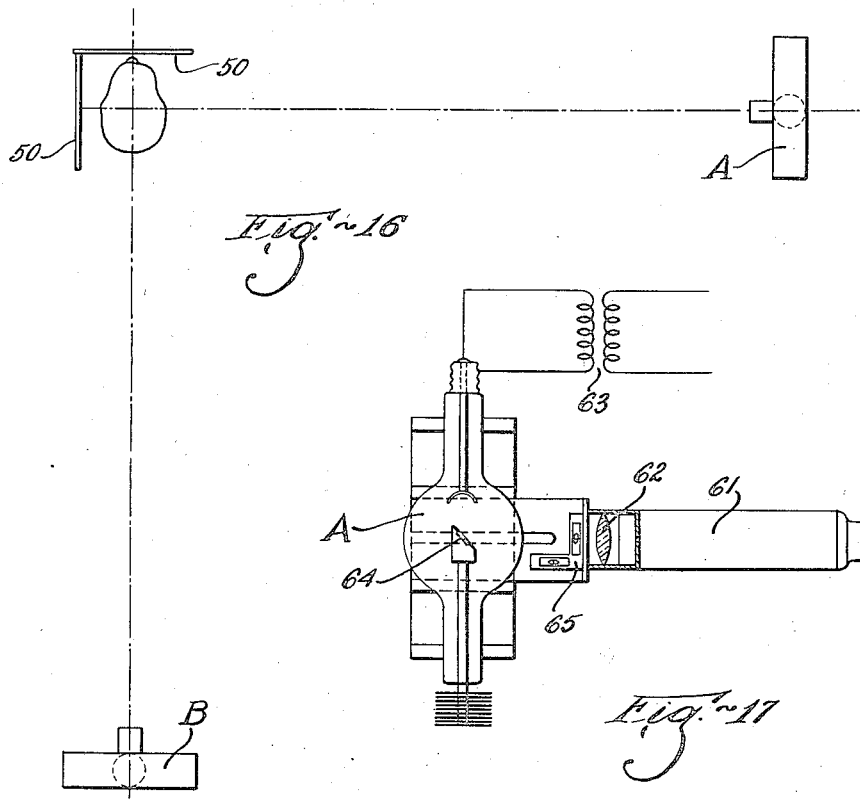
Figure 17:
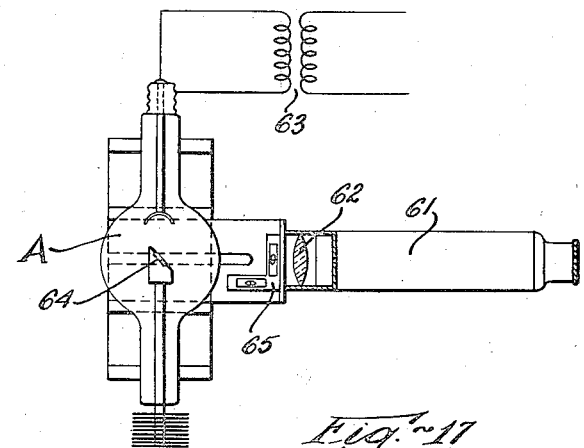
Figure 18:
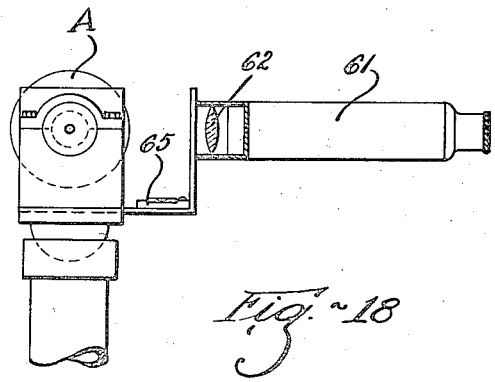
Figure 19:
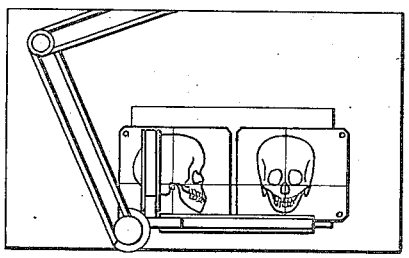

In the drawings, Fig. 1 represents a side elevation of one form of apparatus suitable for the invention; Fig. 1a is a diagram, illustrating an attachment for infants; Fig. 2 is a detail sectional elevation, on a larger scale, on the line 2—2, Fig. 1; Fig. 3 is a front elevation of the apparatus, the chair being omitted; Fig. 4 is a detail plan view of one of the side ear post carrying arms; Fig. 5 is a sectional elevation on the line 5—5, Fig. 4; Fig. 6 is a sectional elevation on the line 6—6, Fig. 4; Fig. 7 is a front elevation of the front attachment for carrying the nasion rest; Fig. 8 is a detail sectional elevation on the line 8—8, Fig. 7, and also illustrating the mouth cast attachment; Fig. 9 is a sectional plan view on the line 9—9, Fig. 7; Fig. 10 is a bottom sectional plan view on the line 10—10, Fig. 8; Fig. 11 is a detail sectional elevation on the line 11—11, Fig. 9; Fig. 12 is a plan view of a part of the head holder; Fig. 13 is a detail sectional elevation, on a larger scale, on the line 13—13, Fig. 12; Fig. 14 is a detail sectional elevation on the line 14—14, Fig. 13; Fig. 15 is a detail sectional elevation on the line 15—15, Fig. 4; Fig. 16 is a diagrammatic plan view illustrating the relation between the head holder and X-ray sources; Fig. 17 is a detail plan view, partly in section, through one of the X-ray tubes; Fig. 18 is a side elevation, partly in section, thereof; and Fig. 19 illustrates diagrammatically how the Roentgenograms are compared.

According to my invention I utilize both cranial (hard tissue) and cephalometric (soft tissue) landmarks of the head for the purpose of recording the relations of its parts to each other. While the invention is capable of use for any kind of study or observation of head parts, particularly those of live subjects, it is particularly adapted and has been extensively employed for the purpose of recording and measuring changes in the jaws or jaw parts with relation to other parts of the head, for the purpose of measuring, recording and assisting in the correction of dental or facial deformities by orthodontic practices.

Accordingly, I have provided apparatus by means of which the head may be brought to and held accurately and positively in a definite more or less standardized position in which a suitable number, such as two, of Roentgenograms may be produced, one lateral or in profile and the other frontal, which by their planes at right angles to each other, become projections in two planes of all head parts reproduced therein, and not only identify and record in three planes of space the locations of the head parts at the time, but enable comparative studies to be made of changes of location of the head parts resulting from differences in growth, as well as providing other advantages, as will appear. Although not essential, the standard position of the head chosen as most suitable for the purposes of the present invention is that position in which the Porion axis and Frankfort plane are both horizontal. The first is a horizontal transverse line through the upper edges of the ear holes, while the second intersects said axis and the lower left orbital point, to wit, the lowest point on the inferior margin of the left bony orbit. The apparatus includes, broadly speaking, (a) a head holder, (b) the X-ray source or sources, (c) the mouth cast attachment and (d) apparatus by which the Roentgenographic records may be brought into juxtaposition for comparative study or observation.

The head holder

This consists of any suitable devices mounted on a stable base, such as the floor or a heavy support thereon, and so arranged that the holder may be moved and presented to the head or the head may be moved and presented to the holder to establish and maintain in either case the desired accurate and definitely fixed standard head position. A convenient way of doing this is to provide a suitable stable chair for the patient, with the head holder supported on or near the chair in fairly stable relationship thereto, but with some adjustment, such as of the chair seat toward the head holder or vice versa, or both, so as to bring the head and head holder into the standard stabilized relationship. The drawings show a suitable dental or other heavy chair 1 whose seat may be adjustable up and down by suitable means (not shown). Behind the chair is a suitable support, such as a heavy table 2, on which is firmly mounted and held, such as by the clamps 3, the base or frame 4 of a head holder marked generally 5, the frame being adjusted on the table by shims or otherwise until the head holder and all of its parts are horizontal, as indicated by the spirit levels 4a, Fig. 12.

The head holder is also preferably provided with some vertical adjustment. In the arrangement shown the stationary base 4 has a rigid sleeve portion 6 in which slides a large cylindrical stem 7 provided at its lower end with a cross head 8 having pierced ears 9 traveling on guide rods 10 rigidly attached to the base 4, the stem 7 being capable of vertical adjustment by rotation of the hand wheel 11 to turn the feed screw 12 in its nut 13.

The stationary base 4 supports two rigid posts 14, one of which carries a vertical graduated scale 15 along which moves some part, such as an edge 15a or a pointer, of a member moving with the stem 7, for measuring and recording vertical adjustment of the head holder as a whole. Each post is provided at its upper end with an arm 16a or 16b having a hub 17 turning on a trunnion 18 of its post, with pin and slot means 19 (Fig. 15) interconnecting them to enable the arms to be moved to either of two positions, one the normal horizontal operating position shown in Fig. 1 and the other with the arms turned up and back out of the way to an inoperative position. A clamping nut 20 enables each arm to be clamped in either position. One arm, such as the arm 16a at the right of the patient, is preferably made of some material transparent to X-rays, such as bakelite, so it will not cast a shadow, for a purpose which will appear. The other may be made of steel, brass, or any suitable material, even bakelite.

Said arms at their outer ends carry horizontal ear posts extending and adjustable toward and in alinement with each other. That is to say, the ear post in each arm is horizontally in alinement with and extends toward and is adjustable toward and from the ear post in the other arm. The posts comprise inner more or less blunt and smoothly rounded tip portions 21a, 21b designed to enter the ear holes and mounted at the ends of rods 22 which slide and may be clamped by set screws 24 in sleeve portions 23 at the ends of the arms 16. The rods 22 may be accurately adjusted toward and from each other and preferably are provided with means by which their adjustments may be utilized to insure the head of the patient lying centrally between the two arms. For this purpose, for example, either or both of the rods 22 may be provided with graduations 25 registering with an end of the sleeves 23 through which they slide. The head being brought into proper position, these ear posts are pushed into the ear holes to a home position and the two rods are adjusted to shift the head laterally until the two scale readings are the same, whereupon the rods are clamped by the set screws 24. This arrangement of the head insures that its Porion axis is horizontal and that its median sagittal plane is midway between the two arms and in the true median plane of the apparatus as a whole.

To establish the Frankfort plane in horizontal position the apparatus is provided with suitable means adapted to engage the head elsewhere than at the ear holes to rigidly lock it in proper position after it has been properly rotated about the Porion axis to bring the Frankfort plane into horizontal position. The particular means chosen for the purpose is a nasion rest 27, which is a curved block mounted at the lower end of a rod or bar 28 vertically slidable in a member 29 and held in adjusted position thereon by a clamp 30. On its front face the bar 28 may be provided with a graduated scale 31 cooperating with an edge of the member 29, as in Fig. 7, to indicate the vertical adjustment, and it may also carry a second detachable scale 32 facing laterally and provided with graduating marks made of lead or other suitable material adapted to cast a shadow on the lateral Roentgenogram and automatically provide thereon a scale of true measurements in the median sagittal plane, regardless of any divergence of the X-rays from the source, but said scale is otherwise transparent to X-rays.

The nasion rest is mounted so that it always lies in the median sagittal plane, but it is adjustable fore and aft, and in the particular machine shown there are three separate adjustments for this purpose, the reasons for which appear hereafter.

In the first place, the nasion rest is carried by a transverse bar 33 supported on two posts 34 rigidly mounted on a front attachment marked generally 35 and illustrated in Fig. 7. Member 29, on which the nasion rest is mounted, is provided with a slotted base 29a adjustable fore and aft on the bar 33 and held in any adjusted position thereon by a clamp 33a, the top of the base 29a carrying a scale (not shown) to indicate fore and aft adjustment of the nasion rest with reference to the bar 33. This particular adjustment is to take care of long nosed patients, as will appear.

The second fore and aft adjustment is the adjustment of the front attachment 35 upon the parts which support it. The front attachment is removably attached to the front portion of a shoulder plate 36 illustrated in Fig. 12, and the latter is attached to and forms part of a slide 37, Figs. 1 and 13. The front attachment 35 at one side has a depending L-shaped portion 35a which underlies a part of the shoulder plate 36, as shown in Fig. 1, and is also provided with rack and pinion mechanism including a pinion 351 (Fig. 11) mounted on a shaft 352 carrying a knurled head 353 and normally held down by a spring 354, with the pinion in engagement with a rack 355 mounted in the shoulder plate 36. By pulling up the head 353 to disengage the pinion, the front attachment can be slid rearwardly into position on the shoulder plate and by releasing the knurled head 353 the teeth of the pinion can be brought into engagement with the rack so that the front attachment can be delicately adjusted fore and aft to any desired position on the shoulder plate. A suitable scale 356 indicates the adjustment, said scale preferably having two zero points, one referring to the fore and aft position relative to the vertical plane through Porion and the other referring to the fore and aft position relative to the vertical plane through the frontal film plane. The front attachment may be clamped in any adjusted position by the clamp screw whose operating head is shown at 35I. This adjustment is the one ordinarily employed for normal children to bring the nasion rest into proper engagement with the head.

The third fore and aft adjustment referred to is of the shoulder plate as a whole. As stated, it forms part of a slide 37 which is mounted for fore and aft sliding movement on a head 38 rigidly attached to the top of the stem 7, the sliding adjustment being produced by operating rack and pinion mechanism 38a, Fig. 14, connecting the head 38 and slide 37 and operable by the knurled knob 39. The various fore and aft positions of slide 37 are indicated on a scale 40 marked on the upper surface of the slide, the edge of scale 15 serving as a pointer. The adjustment of the slide 37 on head 38 moves the shoulder plate with reference to nasion and is utilized for children whose shoulders are abnormally located with reference to the head, such as in the case of humpbacked or other deformed children.

Usually (with normal subjects) the first and third adjustments referred to are kept at the zero point and fore and aft adjustment is accomplished only by adjusting the front attachment on the shoulder plate, the said first and third adjustments being resorted to only in the special instances referred to.

When the ear posts are properly placed and clamped, the patient is told to settle down in the chair, or the chair is slightly lowered so as to bring the head down upon the ear posts, and the head is then turned about the Porion axis, until by observation the lower left orbital point becomes level with an indicator 4I pivoted on the arm 16b at the same level as the upper surface of its ear post center, in which position of the head the Frankfort plane is horizontal. Indicator 4I may be swung around against the nearby post 34 which on its rear face carries a scale 34a to cooperate with the indicator and indicate the vertical adjustment. The nasion rest is now brought into the head holding position stated and is there locked as a clamp for the head. The head is now in the standard position before referred to.

The nasion rest preferably is arranged to record its own position on the profile view, for which purpose it may be made of wood, bakelite or other material transparent to X-rays and carries embedded within it a small piece 27a of lead or other suitable material adapted to cast a shadow on the film. Other parts of the apparatus, such as one or both of the ear post tips, may be provided with like small lead pieces to establish other shadow landmarks, if desired.

The head holder is so arranged as to enable a cassette or film holder to be inserted into position both at one side of and in front of the head, for the purpose of producing the two Roentgenographs in planes at right angles to each other before referred to. Of course, the nearer the cassette is to the head the less do the Roentgen rays spread in their paths from the head to the film, so that the apparatus is preferably arranged to locate the cassette as near to the head as is possible. This requires a special form of at least one of the ear posts. Referring to Fig. 3, the ear post at the left of the patient is made of special form, to be usable like its companion for direct insertion into the ear hole, or, by adjustment of an accessory, in a manner to enable the cassette to be inserted or removed without disturbing the head position established in part by the ear post. As shown in Fig. 5, its rod 22 carries detachably at its inner end a bridge including a pair of parallel bars 42 jointed at their upper ends by a block 43 but free of connection at their lower ends, one of which bars is removably attached to the rod 22 and the other of which carries a supplemental extension ear post end portion 2Ic. Between said bars is a block 44 carried by a rod 45 slidable in block 43 and which block 44 may be brought into alinement with the rod 22 and back up its inner extension 2Ic when the latter is pushed into its ear, and at the same time retain accuracy as regards the indicating scale 25. Block 44 is a little narrower than the bars 42, as shown in Fig. 6, so that the cassette may be first pushed partly into place to hold the bars separated, after which the block 44 is raised and the cassette pushed all the way in. One bar 42 is provided with a rearwardly extending ear 46 from which a pivot pin 47 extends into the arm 16b, and also with a slidable latch 48 engaging behind a collar 49 of the ear post. By releasing the latch the extension may be readily removed and laid aside. One bar 42 may be provided with a detachable transparent scale member 42a, with lead graduations, like the scale 32, for the purpose of recording on the frontal view a scale of true dimensions in the vertical plane through Porion.

The cassette, shown in dotted lines at 50, is of any suitable form, preferably adapted to enclose and hold in flat position a photographic film on which the image is produced. Said film always lies in the cassette at a definite position, so that the parts of the apparatus may be calibrated or measurements may be taken with reference to the position of the film in the cassette, even though it may not be seen, as will be readily understood.

The slide 37 preferably is provided with means for supporting and guiding the cassette for the profile view, such as a longitudinal guide 5I carried by a slide 52 adjustable laterally or toward and from the head on slide 37. At the rear end of said guide is a post 53 carrying arms 53a which embrace and support the cassette near its top, said post being held in any position along the guide by clamping devices 53b. When it is slid rearwardly into the guide 5I and between the bars 42 and between the arms 53a, it is held rigidly with the film in a fixed vertical plane at a definite distance from the median sagittal plane of the head, indicated on the scale 54, Fig. 12.

Provision is also made for inserting a cassette into the head holder for taking the frontal view. This cassette is inserted in front of the patient in a similar guide 55 carried by the front attachment 35, the cassette lying anteriorly of the nasion rest 27 and near its upper end being supported by embracing arms on a post 56 similar to the post 53, but adjustable laterally of the machine by devices similar to those used for the front attachment and shown in Fig. 11. When the frontal picture is taken the cassette therefore lies in a frontal plane at right angles to the Frankfort plane and parallel to the Porion axis. Because the guide 55 is not adjustable fore and aft on the front attachment, which carries the nasion rest, the latter is made adjustable on the bar 33, as stated, to avoid discomfort to long nosed patients.

The X-ray tubes and supports

Special precautions are taken to insure proper location and orientation of the X-ray tubes or other sources of Roentgen rays with reference to the head. The X-ray sources, herein referred to as X-ray tubes, are preferably located a definite distance from the film to be exposed thereto. Since X-rays are generated at a small anode target from which they diverge in all directions, it is clear that the greater the separation between source, object and film the greater will be the divergence of the rays. On the other hand, more time is required for proper exposure when the source and film are remote. Choosing between the two limits, practical experience has shown that a distance of five feet from source to object is satisfactory for all purposes, and in the present instance that distance has been chosen as the standard.

Referring first to the profile view, the X-ray tube therefor, indicated generally at A, Figs. 16, 17, 18, is mounted upon a suitable support, such as a wheeled stand, or upon a fixed base such as a part of the table 2, in such manner that it can be adjusted bodily in any horizontal direction or up and down, and can be turned and tilted. Adjustable devices for this purpose are not shown in full detail but will be readily understood. The tube is first placed with its anode at the proper distance, five feet, from the median sagittal plane. The tube itself is specially adapted to enable it to be so placed that the X-rays generated focus upon and travel along the Porion axis. For this purpose I have provided special optical means and method for orientating the X-ray tube. The tube itself is provided with what for convenience may be termed a detachable projector or telescope, such as the detachable tube 61, carrying a suitable adjustable focussing lens 62. From the electrical standpoint, it is also provided with means for producing incandescence of its cathode from a low voltage source to produce a beam of optically visible light capable of use in tube location. A suitable transformer 63 may be used for this purpose with its primary connected to an ordinary 110 A. C. 60 cycle source and its secondary arranged to produce say 6 volts, sufficient when connected to the cathode, to cause its incandescence. The light rays thus produced are reflected by the anode target 64 through the lens and along the optical axis of the telescope toward the head. The X-ray tube is first brought to the proper elevation and is then leveled up by the use of spirit levels 65 and is then turned around until by use of the optically visible beam of light referred to the two ear posts 21 are found to cast coinciding or overlapping shadows upon a cassette or object surface placed back of them. In this position all X-rays generated at the target will emanate therefrom, and in the direction of the head to be examined will travel some along the Porion axis and others along lines at an angle thereto but diverging from the same target. As a result, while the image produced on the film is of course slightly larger than the actual sizes of the parts of the head, it is possible by simple trigonometry to determine the actual dimensions of parts from their projections on the film, when the distance from the anode to the median sagittal plane and to the film and the distance of the head part from the median sagittal plane are known.

All of these distances are either recorded or are shown on the Roentgenogram produced, as will be readily understood, in addition to which the scale 32 casts its shadow upon the film with a permanent record thereon of true dimensions along the median sagittal plane.

The X-ray tube B for producing the frontal view is like tube A and may be orientated in the same manner so that its target lies in the line at the intersection of the Frankfort and median sagittal planes, as will be readily understood.

Fig. 19 illustrates somewhat diagrammatically the way in which the frontal and lateral Roentgenograms are brought into juxtaposition for comparison by drafting methods. The two views, on transparent film, are laid side by side on a drafting table 70 and are fastened in such position that the Frankfort plane in both views is in the common horizontal line. The two films are usually placed over a glass plate 71 illuminated from beneath. In this position, by use of a universal drafting machine, scales, etc., the two views may be used in exactly the same way as the front and side views of any object are used. Various landmarks and other points may be located and identified in the two views and by proper measurements their positions may be readily determined with reference to any other point, plane or the like.

Mouth cast appliance

The head holder is also provided with means for taking an impression of the mouth cavity, including a plaster holder 57 removably mounted in a universally adjustable and clamping support 58 on a post 59 vertically adjustable on the front attachment 35, such as by being slidable vertically, but non-rotatable as by a spline, in a tubular member 59a carried by the front attachment. The post 59 is provided with graduations 59b and with a collar 59c which can be clamped to it and which forms a stop and indicator of the final position of the mouth tray. This is brought to proper position in the mouth and is clamped by its clamping devices, and the collar 59c is clamped to the rod 59. The mouth cast or mold is then made and without disturbing the adjustments of the parts the post is lifted out and placed in a like companion support in which a cast is made with the top surface of the resulting model (assuming a cast of the upper teeth) identical with the Frankfort plane. This is possible because the scale indications at 59b enable the mold to be set in the casting apparatus at the proper distance from the Frankfort plane. Likewise, the model may be formed with a rear vertical surface in the vertical Porion plane or at a known distance therefrom. Therefore, the model made from the mold carries its own identifications of the Frankfort and Porion planes so that any part of the model can be compared as to position, etc., with the various landmarks of the head as determined by the present apparatus and its various adjustments and settings.

General description

In use of the apparatus as a whole the patient is seated in the chair and his body is adjusted to the apparatus so that the head is in proper position with reference to the ear posts. The shoulder plate of course embraces the shoulder parts of the body. If desired, the apparatus may be provided with an additional shoulder or back rest, supplementing the chair back, and comprising a small adjustable slide 66 carrying shoulder rests 67 and adjustable by rack and pinion mechanism 68 operated by the hand wheel 69. The ear posts are next brought to home position in the ear holes and the head is rotated until the Frankfort plane is horizontal, whereupon the front attachment is applied and the apparatus is adjusted until the nasion rest locks the head in the standard position. Thereupon the two views, profile and frontal, are taken in the manner described, with each film as close to the head as possible. Finally, the mouth tray is adjusted to position and one or more mouth impressions are taken in the manner described. During all of these various operations readings are taken of the adjustments of all of the parts of the apparatus and the complete record of examination includes all necessary information so that at any future time the patient again can be placed in the apparatus in identically the same position, or, in any event, a new set of views can be taken at a later date with sufficient identifying measurements so as to relate the views to the definite standard Roentgenograms, such as by reference to the Porion axis and the Frankfort plane in the instance described.

Of course, while the best results are secured when both frontal and profile views are produced, and the apparatus has been extensively so used, nevertheless some useful information may be obtained from only one of these views. For instance as a further development of this technique the apparatus has been adapted for the taking of X-ray photographs of very young infants, say three months old. Fig. 1a illustrates somewhat diagrammatically a table attachment C which can be applied to the chair shown in Fig. 1 to provide a level supporting surface on which the infant may be laid in the proper position to bring its head near to the ear posts. The front attachment is of course taken off and is not used, but the head may be adjusted to the ear posts and even with such young infants a profile view may be produced.

What I claim is:

1. In apparatus of the class described, a pair of ear posts and a nasion rest, and means adjustably interconnecting said ear posts and nasion rest and enabling the ear posts to be introduced into the ear holes and the nasion rest simultaneously to be applied to the head at the root of the nose, to thereby fix the head in a definite position.

2. Apparatus of the character described, comprising a head holder including supporting means, a pair of ear posts mounted upon said supporting means in proper position to engage and enter the head at the ear holes, and a nasion rest mounted on the supporting means in proper position to engage the head at the root of the nose, to thereby fix the head in definite position.

3. Apparatus of the class described, comprising supporting means, a pair of ear posts mounted in alinement and spaced apart upon said supporting means, said ear posts being also adjustable toward and from each other to be thereby insertable into the ear holes of the head to establish the position of its Porion axis, and a nasion rest mounted upon said supporting means at one side of the line of adjustment of said ear posts.

4. Apparatus of the class described, comprising supporting means, a pair of ear posts mounted in alinement and spaced apart upon said supporting means, said ear posts being also adjustable toward and from each other to be thereby insertable into the ear holes of the head to establish the position of its Porion axis, and a nasion rest mounted upon said supporting means at one side of the line of adjustment of said ear posts, said nasion rest being also adjustable toward and from said line.

5. Apparatus of the character described, comprising supporting means, a pair of opposed and alined ear post members carried by said supporting means, a nasion rest located at one side of the line through said post members, and means adjustably connecting said nasion rest to said supporting means for vertical adjustment thereon.

6. Apparatus of the character described, comprising supporting means, a pair of opposed and alined ear post members carried by said supporting means, and a nasion rest located at one side of the line through said post members and mounted upon said supporting means for adjustment toward and from said line.

7. Apparatus of the character described, comprising supporting means, a pair of opposed and alined ear post members adapted in operating position to be inserted into the ear holes of the head, movable means adjustably connecting said ear post members to said supporting means for movement thereon into and out of operative position, and a nasion rest mounted upon said supporting means at one side of a line through said post members.

8. Apparatus of the character described, comprising supporting means, a pair of opposed and alined ear post members, means adjustably connecting said post members to said supporting means for adjustment thereon toward and from each other, a nasion rest located at one side of a line through said post members, and means adjustably connecting said nasion rest to said supporting means for vertical adjustment thereon.

9. Apparatus of the character described, comprising supporting means, a pair of opposed and alined ear post members adapted to be inserted into the ear holes of the head, opposed arms movably connecting said ear post members to said supporting means for adjustment thereon into and out of operating position, one of said ear post members being adjustable in its arm toward and from the other ear post member, and a nasion rest connected to said supporting means and located at one side of the line through said post members.

10. Apparatus of the character described in claim 2, said supporting means being provided with seat means for supporting a cassette in definite relation to a head located by said ear posts and nasion rest.

11. Apparatus of the character described in claim 2, including a seat on the supporting means for supporting a cassette in a vertical plane transverse to the axis of one of said ear posts and near to its head engaging end.

12. Apparatus of the character described in claim 2, including a seat on the supporting means for supporting a cassette in vertical position parallel to said ear posts and adjacent said nasion rest.

13. Apparatus of the character described, comprising supporting means, a pair of opposed alined ear post members and a nasion rest mounted upon said supporting means, and a cassette attachment, comprising a base member adapted for detachable connection with the head engaging end portion of one of said ear post members, a head engaging end portion spaced therefrom, and a laterally extending bridge member connecting said last named head engaging end portion and said base member and adapted to embrace a cassette placed therebetween.

14. Apparatus of the character described, comprising supporting means, two arms supported thereby with their extremities in spaced relation, and two alined ear posts, one in each arm, adjustable toward and from each other, one of said ear posts comprising spaced end portions provided with separated laterally extending members spaced from each other and connected at their outer ends to thereby form a bridge spanning the gap between the spaced end portions of said ear post and into which gap a cassette may be inserted.

15. Apparatus of the character described, comprising supporting means provided with a pair of opposed alined ear posts adjustable toward and from each other, one of said ear posts having a gap between its end portions into which a lateral cassette may be inserted, said supporting means being also provided with a detachable front portion carrying a nasion rest.

16. Apparatus of the character described, comprising supporting means provided with a pair of opposed alined ear posts adjustable toward and from each other, one of said ear posts having a gap between its end portions into which a lateral cassette may be inserted, said supporting means being also provided with a detachable front portion carrying a nasion rest, said detachable front portion having a seat for supporting a frontal cassette.

17. Apparatus of the character described, comprising supporting means provided with a pair of opposed alined ear posts, and an indicator carried by said supporting means at the level of the ear posts and adjustable horizontally and transversely relatively thereto and serving as a gauge for locating the head with its Frankfort plane horizontal, said supporting means also being provided with a nasion rest adjustable into engagement with the root of the nose when the head is in said position.

18. Apparatus of the character described, comprising supporting means provided with a pair of opposed alined ear posts, an indicator carried by said supporting means at the level of the ear posts and adjustable horizontally and transversely relatively thereto and serving as a gauge for locating the head with its Frankfort plane horizontal, said supporting means also being provided with a nasion rest adjustable into engagement with the root of the nose when the head is in said position, and means for indicating the positions of said ear posts, said gauge, and said nasion rest with reference to each other.

19. Apparatus of the character described, comprising a head holder including supporting means, a pair of opposed alined ear posts mounted on said supporting means and adapted to engage and enter the ear holes of the head, an adjustable nasion rest mounted on said supporting means and adapted to engage the head at the root of the nose to hold the head with its Frankfort plane horizontal when the ear posts are in the ear holes, seat means on the supporting means for supporting a lateral cassette in a vertical plane neighboring one side of the head, and an X-ray tube adjustable with reference to said supporting means to a standard distance from the center of the head and with its target in alinement with said ear posts.

20. Apparatus of the character described, comprising a head holder including supporting means, a pair of opposed alined ear posts mounted on said supporting means and adapted to engage and enter the ear holes of the head, an adjustable nasion rest on said supporting means adapted to engage the head at the root of the nose to hold the head with its Frankfort plane horizontal when the ear posts are in the ear holes, said supporting means being provided with seat means for supporting a frontal cassette in a vertical plane neighboring said nasion rest, and an X-ray tube adjustable with reference to said supporting means to a standard distance from the center of the head and with its target in the line of intersection between the Frankfort and median sagittal planes.

21. Apparatus of the character described, comprising a head holder including supporting means, a pair of ear post members and a nasion rest member carried thereby and adapted to be applied to the ear holes and to the root of the nose of a head in said holder, one of said members being provided with a piece of a material adapted to cast a locating shadow when an X-ray exposure is made.

22. Apparatus of the character described, comprising a head holder including supporting means, a pair of ear posts mounted upon said supporting means, a shoulder plate adjustable fore and aft on said supporting means, and a nasion rest adjustable fore and aft on said shoulder plate.

23. Apparatus of the character described, comprising a head holder including supporting means, a pair of ear posts carried thereby, a shoulder plate adjustable fore and aft on said supporting means, a front attachment detachably connected to said shoulder plate and adjustable fore and aft thereon, and a nasion rest adjustable fore and aft on said front attachment.

24. Apparatus of the character described, comprising a head holder including supporting means, a pair of ear posts carried thereby, a shoulder plate adjustable fore and aft on said supporting means, a front attachment detachably connected to said shoulder plate and adjustable fore and aft thereon, and a nasion rest adjustable both vertically and fore and aft upon said front attachment.

25. Apparatus of the character described, comprising a head holder including supporting means, a pair of ear posts and a nasion rest, means whereby said posts and nasion rest may be adjusted upon said supporting means to engage them with a head to be examined and for fixing and determining their relative positions thereupon, and scale means mounted upon said supporting means to lie in the median sagittal plane of the head and provided with graduations formed of a material adapted to cast a shadow when a profile X-ray exposure is made.

26. Apparatus of the character described, comprising a head holder including supporting means, a pair of ear posts and a nasion rest, means whereby said posts and nasion rest may be adjusted upon said supporting means to engage them with a head to be examined and for fixing and determining their relative positions thereupon, and scale means mounted upon said supporting means to lie in the vertical Porion plane and provided with graduations made of a material adapted to cast a shadow when a frontal X-ray exposure is made.

BIRDSALL H. BROADBENT.